United States Patent
Tsukamoto et al.

(10) Patent No.: US 7,535,981 B2
(45) Date of Patent: May 19, 2009

(54) CLOCK GENERATION CIRCUIT AND METHOD THEREOF

(75) Inventors: Sohichi Tsukamoto, Gifu (JP); Shuhsaku Matsuse, Kusatsu (JP); Makoto Ueda, Kyoto-fu (JP)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/282,005

(22) Filed: Nov. 17, 2005

(65) Prior Publication Data

US 2006/0133555 A1 Jun. 22, 2006

(30) Foreign Application Priority Data

Dec. 17, 2004 (JP) .............................. 2004-365367

(51) Int. Cl.
  *H04L 7/00* (2006.01)
(52) U.S. Cl. ...................... 375/354; 375/327; 375/373; 375/376; 377/47; 377/48; 377/49; 377/50; 327/115; 327/117; 327/151; 327/160; 331/34; 331/48
(58) Field of Classification Search .................. 331/17, 331/25, 34, 48, 16, 18; 327/117, 115, 156, 327/147, 151, 160, 105, 107, 106; 377/48, 377/47, 49, 50; 375/373, 376, 327, 354
See application file for complete search history.

(56) References Cited

U.S. PATENT DOCUMENTS 5,834,987 A * 11/1998 Dent ........................... 332/127
7,012,984 B2 * 3/2006 Sander et al. ............... 375/376
7,187,217 B2 * 3/2007 Marutani ..................... 327/117
2002/0196060 A1 * 12/2002 Ichimaru ..................... 327/156
2003/0048863 A1 * 3/2003 Saeki ........................... 375/376

FOREIGN PATENT DOCUMENTS

| JP | PUPA 62-112423 | 5/1987 |
| JP | PUPA 02-271717 | 11/1990 |
| JP | PUPA 05-335940 | 12/1993 |
| JP | PUPA 11-098007 | 4/1999 |

OTHER PUBLICATIONS

Tsunoda, Hideo, "PLL Basics and Applications", Tokyo Denki University Press, second impression of the 1st edition, Sep. 20, 1979.

* cited by examiner

*Primary Examiner*—Chieh M Fan
*Assistant Examiner*—Siu M Lee
(74) *Attorney, Agent, or Firm*—James R. Nock (57) ABSTRACT

The present invention generates an output clock signal CLKreq having a frequency freq between the frequency fref/A of a divided clock signal CKL1 and the frequency fref/(A+1) of a divided clock signal CLK2. A clock divider circuit selectively generates divided clock signals CLK1, CLK2. A discrete value correction circuit controls the clock divider circuit so as to repeat C times the process of generating the clock signal CLK2 once and the clock signal CLK1 (Q−1) times and then to generate the clock signal CLK1 R times if C<D and so as to repeat D times the process of generating the clock signal CLK1 once and the clock signal CLK2 (Q−1) times and then to generate the clock signal CLK2 R times if C>D. A, B, and C are natural numbers satisfying freq=fref/(A+C/B). In D=B−C, Q is a quotient of B/C if C<D or a quotient of B/D if C>D.

8 Claims, 5 Drawing Sheets

CLTD=0(C>D)

Fig. 5

CLTD=0(C>D)

CLOCK GENERATION CIRCUIT AND METHOD THEREOF

FIELD OF THE INVENTION

The present invention relates to a clock generation circuit and a method thereof, and more particularly to a clock generation circuit and a method thereof for generating an output clock signal having a frequency freq between a frequency fref/A of a first divided clock signal and a frequency fref/(A+1) of a second divided clock signal on the basis of the first divided clock signal obtained by dividing a reference clock signal having a frequency fref by A and the second divided clock signal obtained by dividing the reference clock signal by (A+1).

BACKGROUND OF THE INVENTION

A smart card is referred to as an IC card in Japan, which is generally classified into two types: a contact smart card and a contactless smart card. There are various types of contact smart cards, which are different in frequencies of clock signals required. For example, one smart card requires 4 MHz and 8 MHz, another smart card requires 4.5 MHZ, 6.75 MHz, and 13.5 MHz, and still another smart card requires 4.608 MHz, 9.216 MHz, and 18.432 MHz. In ISO7816-3 which defines the electrical characteristics of the contact smart card, it is specified that duty cycle of the clock signal shall be between 45% and 55% of the period during stable operation. Therefore, it is necessary to generate clock signals having these frequencies and complying with ISO7816-3.

When there is a need for a frequency freq between a frequency CLK/A obtained by dividing a frequency CLK by A and a frequency CLK/(A+1) obtained by dividing the frequency CLK by (A+1), it is necessary to correct the remainder of CLK/freq. The document described below discloses a method of correcting the remainder.

Japanese Patent Laid-Open No. 2001-308697 (patent document 1 described below) discloses a frequency generation circuit capable of generating clock signals having various frequencies. The frequency generation circuit comprises divide-by-n means for dividing a clock signal having a frequency K by n, pause control signal output means for outputting a 1/K-sec pause control signal i times after or while the divide-by-n means repeats m times the process of dividing the clock signal by n, and output stop means for stopping an output of the divide-by-n means according to the pause control signal or for stopping an input of the divide-by-n means according to the pause control signal and stopping an output of the divide-by-n means by means of the input stop operation, so as to generate clock signals having a frequency of m×K(n×m+i).

Since this frequency generation circuit corrects the remainder at a time, however, the corrected portions are unevenly distributed, thereby generating an unbalanced output clock signal.

Japanese Patent laid-Open No. Hei 11-220384 (patent document 2 described below) discloses a frequency generation circuit for generating a pulse having a predetermined frequency $C_1$ from a pulse having a reference frequency $C_o$. The frequency generation circuit generates the pulse having the predetermined frequency $C_1$ by equally distributing a residual (a remainder of $C_o/C_1$) between the divided pulse generated by dividing the pulse having the reference frequency $C_o$ and the pulse having the reference frequency $C_o$ to the divided pulses. More specifically, the frequency generation circuit includes: dividing means for generating a pulse having a predetermined frequency $C_1$ by dividing a pulse having a reference frequency $C_o$ by an integer value $K_o$; first correction means for dividing the pulse having the predetermined frequency $C_1$ by an integer value $K_1$, generating a pulse having a residual frequency $C_2$ generated by the dividing of the dividing means, and correcting the pulse generated by the dividing means; and i-th correction means for dividing a pulse having a residual frequency $C_i$ (i is 2 or a greater integer) by an integer value $K_i$, generating a pulse having a residual frequency $C_{i+1}$ generated by an (i⁻1) correction means, and correcting a pulse output from the (i⁻1) correction means).

While this frequency generation circuit can equally distribute the remainder (the residual), it has a limit to the number of the correction means mounted thereon and thus, if in future the required predetermined frequency $C_1$ increases in variety, a larger error is expected as to a generated predetermined frequency $C_1$.

Moreover, no circuits employ measures to maintain the duty cycle within an allowable range and therefore they do not comply with ISO7816-3.

SUMMARY OF THE INVENTION

The main object of the present invention is to provide a clock generation circuit and a method thereof capable of generating an output clock signal having a frequency freq between a frequency fref/A of a first divided clock signal and a frequency fref/(A+1) of a second divided clock signal on the basis of the first divided clock signal obtained by dividing a reference clock signal having a frequency fref by A and the second divided clock signal obtained by dividing the reference clock signal by (A+1).

Another object of the present invention is to provide a clock generation circuit and a method thereof capable of equally distributing the remainder of fref/freq.

Yet another object of the present invention is to provide a clock generation circuit and a method thereof capable of maintaining the duty cycle of the output clock signal within an allowable range.

According to one aspect of the present invention, there is provided a clock generation circuit comprising dividing means and correction means. The dividing means selectively generates a first divided clock signal and a second divided clock signal and outputs the selected clock signal as an output clock signal. The correction means controls the dividing means so as to repeat C times the process of generating the second divided clock signal once and generating the first divided clock signal (Q−1) times if C<D and for controlling the dividing means so as to repeat D times the process of generating the first divided clock signal once and generating the second divided clock signal (Q−1) times if C>D. It should be noted here that A, B, and C are natural numbers satisfying the following formula (1).

$$freq = fref/(A + C/B) \qquad (1)$$

Moreover, D is represented by D=B⁻C, Q is the quotient of B/C for C<D, and Q is the quotient of B/D for C>D.

According to the clock generation circuit, it is possible to generate an output clock signal having a frequency freq between a frequency fref/A of a first divided clock signal and a frequency fref/(A+1) of a second divided clock signal.

Preferably, the correction means further controls the dividing means so as to generate the first divided clock signal R times if C<D and controls the dividing means so as to generate the second divided clock signal R times if C>D, where R is the remainder of B/C for C<D or the remainder B/D for C>D.

In this condition, the remainder of fref/freq can be equally distributed.

Preferably, the dividing means includes high-pulse generation means and low-pulse generation means. The high-pulse generation means maintains the first or second divided clock signal at a high level until it receives the reference clock signal n times if A=2n (n: natural number) and maintains the first or second divided clock signal at a high level until it receives the reference clock signal (n+1) times if A=2n+1. The low-pulse generation means maintains the first divided clock signal at a low level until it receives the reference clock signal n times and maintains the second divided clock signal at a low level until it receives the reference clock signal (n+1) times.

In this condition, the duty cycle of the output clock signal can be maintained within an allowable range.

Preferably, the dividing means includes a high-pulse width counter, a high-pulse width register, a high-pulse width comparator, a low-pulse width counter, a low-pulse width register, a low-pulse width comparator, and a state control circuit. The high-pulse width counter counts the reference clock signal. The high-pulse width register registers n if A=2n (n: natural number) and registers (n+1) if A=2n+1. The high-pulse width comparator compares a value of the high-pulse width counter with a value of the high-pulse width register and outputs a high-pulse width end signal when the value of the high-pulse width counter reaches the value of the high-pulse width register. The low-pulse width counter counts the reference clock signal. The low-pulse width register registers n. The low-pulse width comparator compares a value of the low-pulse width counter with a value of the low-pulse width register and outputs a low-pulse width end signal when the value of the low-pulse width counter reaches the value of the low-pulse width register. The state control circuit activates the high-pulse width counter in response to the low-pulse width end signal, activates the low-pulse width counter in response to the high-pulse width end signal, and selects the first or second divided clock signal in response to a divided clock selection signal.

The correction means includes a Q counter, a Q register, a Q comparator, a C/D counter, a C/D register, a C/D comparator, and a correction determination circuit. The Q counter counts a low-pulse width end signal. The Q register registers Q. The Q comparator compares a value of the Q counter with a value of the Q register and outputs a Q end signal when the value of the Q counter reaches the value of the Q register. The C/D counter counts the Q end signal. The C/D register registers C or D. The C/D comparator compares a value of the C/D counter with a value of the C/D register and outputs a C/D end signal when the value of the C/D counter reaches the value of the C/D register. The correction determination circuit changes a logical level of the divided clock selection signal in response to the Q end signal and changes a logical level of the divided clock selection signal in response to the first low-pulse width end signal after receiving the Q end signal.

In this condition, it is possible to maintain the duty cycle of the output clock signal within an allowable range and to equally distribute the remainder of fref/freq.

More preferably, the correction means further includes an R counter, an R register, and an R comparator. The R counter counts a low-pulse width end signal. The R register registers R. The R comparator compares a value of the R counter with a value of the R register and outputs an R end signal when the value of the R counter reaches the value of the R register. The correction determination circuit activates the R register in response to the C/D end signal, where R is the remainder of B/C for C<D or the remainder of B/D for C>D.

In this condition, it is possible to equally distribute the remainder of fref/freq.

According to another aspect of the present invention, there is provided a clock generation method comprising the steps of: generating the second divided clock signal once if C<D; generating the first divided clock signal (Q~1) times after generating the second divided clock signal; repeating the steps of generating the second and first divided clock signals C times; generating the first divided clock signal once if C>D; generating the second divided clock signal (Q_1) times after generating the first divided clock signal; and repeating the steps of generating the first and second divided clock signals D times, where A, B, and C are natural numbers satisfying the following formula (1).

$$freq=fref/(A+C/B) \qquad (1)$$

Moreover, D is represented by D=B C, Q is the quotient of B/C for C<D, and Q is the quotient of B/D for C>D.

According to the clock generation method, it is possible to generate an output clock signal having a frequency freq between a frequency fref/A of a first divided clock signal and a frequency fref/(A+1) of a second divided clock signal.

Preferably, the clock generation method further includes the steps of generating the first divided clock signal R times after the step of repeating C times and generating the second divided clock signal R times after the step of repeating D times, where R is the remainder of B/C for C<D or the remainder B/D for C>D.

In this condition, it is possible to equally distribute the remainder fref/freq.

Preferably, the step of generating the first divided clock signal includes the steps of: if A=2n (n: natural number), maintaining the first divided clock signal at a high level until the reference clock signal is received n times; and maintaining the first divided clock signal at a low level until the reference clock signal is received n times after the step of maintaining the first divided clock signal at the high level; and if A=2n+1, maintaining the first divided clock signal at the high level until the reference clock signal is received (n+1) times; and maintaining the first divided clock signal at the low level until the reference clock signal is received n times after the step of maintaining the first divided clock signal at the high level. The step of generating the second divided clock signal includes the steps of: if A=2n, maintaining the second divided clock signal at the high level until the reference clock signal is received n times; and maintaining the second divided clock signal at the low level until the reference clock signal is received (n+1) times after the step of maintaining the second divided clock signal at the high level; and if A=2n+1, maintaining the second divided clock signal at the high level until the reference clock signal is received (n+1) times; and maintaining the second divided clock signal at the low level until the reference clock signal is received (n+1) times after the step of maintaining the second divided clock signal at the high level.

In this condition, it is possible to maintain the duty cycle of the output clock signal within an allowable range.

DETAILED DESCRIPTION OF THE INVENTION

The preferred embodiments of the present invention will now be described in detail hereinafter with reference to the accompanying drawings. The similar or equivalent parts are identified by the same reference numerals in these drawings and their description is not repeated here.

Figure 1:
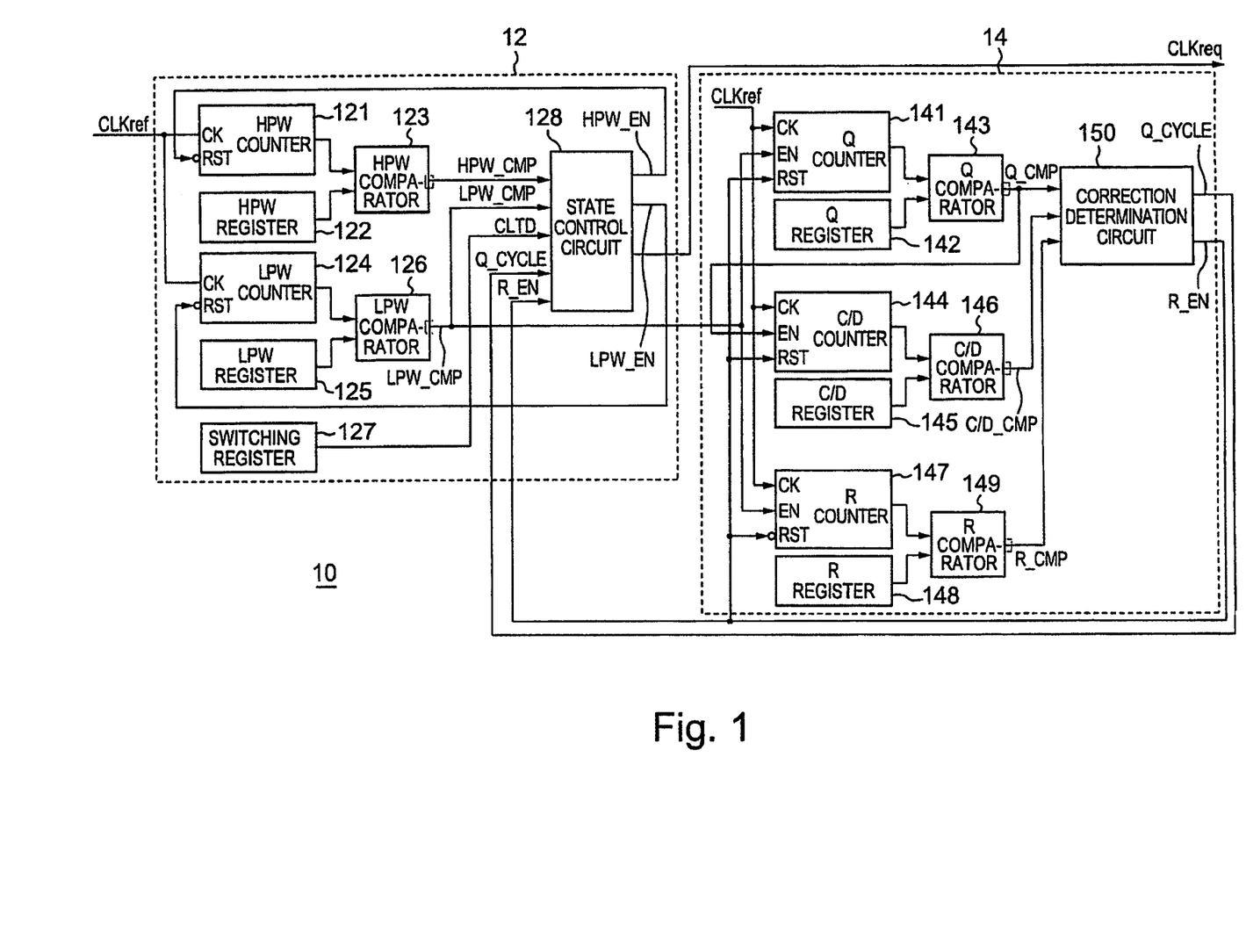
FIG. 1 is a functional block diagram showing a configuration of a clock generation circuit according to an embodiment of the present invention.

Referring to FIG. 1, a clock generation circuit 10 according to this embodiment of the present invention generates an output clock signal CLKreq having a frequency freq on the basis of a reference clock signal CLKref having a frequency fref. The clock generation circuit 10 includes a clock divider circuit 12 and a discrete value correction circuit 14.

The clock divider circuit 12 selectively generates two discrete divided clock signals CLK1, CLK2. Specifically, the clock divider circuit 12 selectively generates the divided clock signal CKL1 obtained by dividing the reference clock signal CLKref by A and the divided clock signal CLK2 obtained by dividing the reference clock signal CLKref by (A+1) and outputs the generated clock signal as an output clock signal CLKreq.

The discrete value correction circuit 14 controls the clock divider circuit 12 so as to maintain the frequency freq of the output clock signal CLKreq between the frequency fref/A of the divided clock signal CKL1 and the frequency fref/(A+1) of the divided clock signal CLK2.

First, the discrete value correction circuit 14 will be described in detail below.

Figure 2:
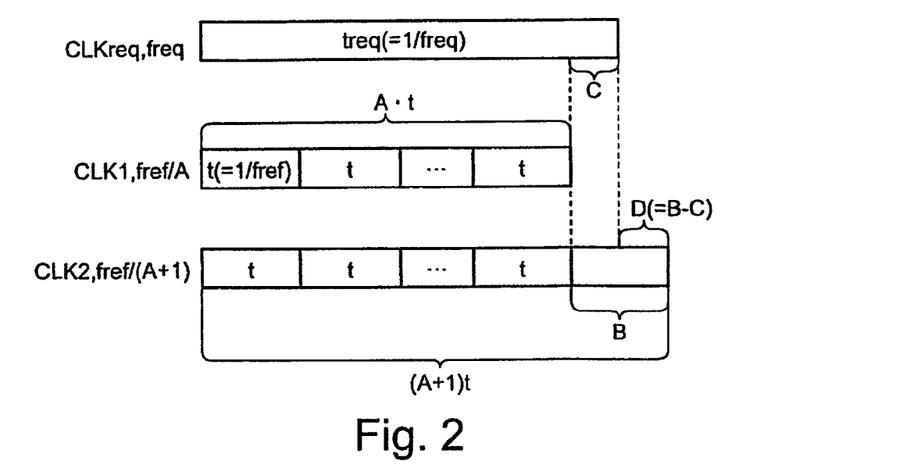
FIG. 2 is a diagram showing a relation between an output clock signal generated by the clock generation circuit shown in FIG. 1 and two divided clock signals generated by a clock divider circuit.

Referring to FIG. 2, there is shown a relation between the output clock signal CLKreq and the two divided clock signals CLK1, CLK2. The period t of the reference clock signal CLKref is represented by t=1/fref. Using the period t, the period of the divided clock signal CLK1 is represented by A/fref=A·t and the period of the divided clock signal CLK2 is represented by (A+1)/fref=(A+1)t.

The period treq=1/freq of the output clock signal CLKreq is represented by treq=1/freq, which is equal to or longer than the period A·t of the divided clock signal CLK1 and shorter than the period (A+1)t of the divided clock signal CLK2.

If the ratio of the lengths shown in FIG. 2 is B:C, the frequency freq of the output clock signal CLKreq is represented by the following formula (1).

$$freq=fref/(A+C/B) \qquad (1)$$

where both A and B are positive integers and C is 0 or a positive integer. If C=0, freq=fref/A and the divided clock signal CLK1 can be output directly as an output clock signal CLKreq. Therefore, the divided clock signal CLK2 is unnecessary.

If C≠0, an output clock signal CLKreq is generated with the divided clock signals CLK1 and CLK2 distributed in a balanced manner.

Using the divided clock signal CLK1 D (=B−C) times and the divided clock signal CLK2 C times, the time required B·treq is represented by the following formula (2).

$$B \cdot treq = DA \cdot t + C(A+1)t \qquad (2)$$

If C<D (=B−C) (if the frequency fref/A of the divided clock signal CLK1 is closer to the frequency freq of the output clock signal CLKreq), it is supposed that Q is the quotient of B/C and R is the remainder. Substitute D=B−C and B=QC+R into the formula (2). Then, the time required B·treq is represented by the following formula (3).

$$B \cdot treq = C\{(A+1)t + (Q-1)A \cdot t\} + RA \cdot t \qquad (3)$$

Figure 3:
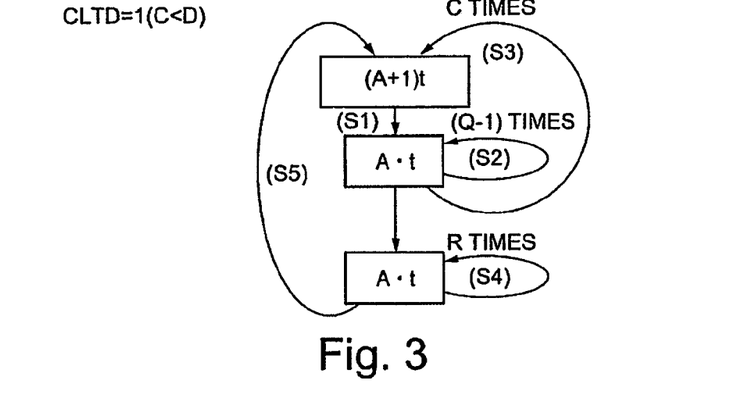
FIG. 3 is a sequence diagram showing a method of generating an output clock signal if C<D using the clock generation circuit shown in FIG. 1.
Figure 4:
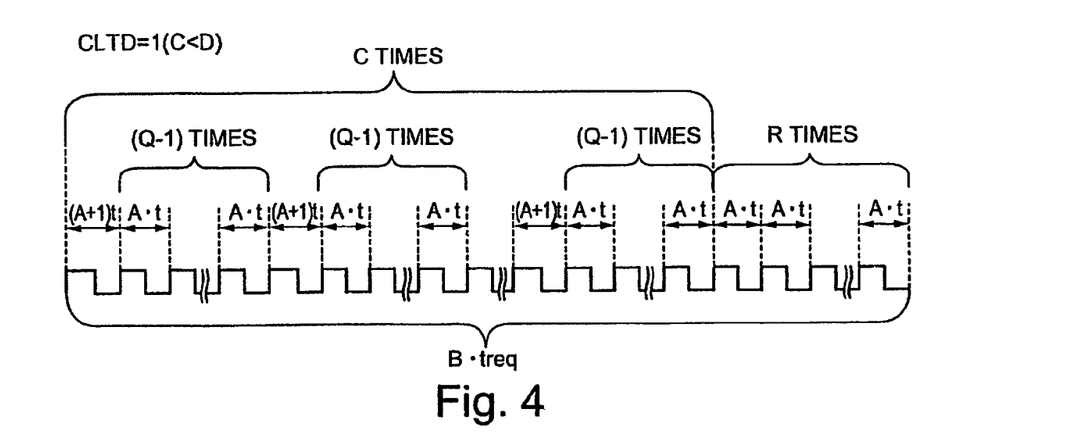
FIG. 4 is a waveform diagram showing the output clock signal generated in the method shown in FIG. 3.

The formula (3) is achieved by the sequence shown in FIG. 3, by which the output clock signal CLKreq shown in FIG. 4 is obtained.

Referring to FIGS. 3 and 4, a clock signal having (A+1)t is output once first (S1), and then subsequently a clock signal having A·t is output (Q−1) times (S2). Next, steps S1 and S2 are repeated C times (S3) and thereafter a clock signal having A·t is output R times (S4). Then, the process returns to step S1 (S5).

Meanwhile, if C>D (if the frequency fref/(A+1) of the divided clock signal CLK2 is closer to the frequency freq of the output clock signal CLKreq), it is supposed that Q is the quotient of B/D and R is the remainder. Substitute C=B−D and B=QD+R into the formula (2). Then, the time required B·treq is represented by the following formula (4).

$$B \cdot treq = D\{A \cdot t + (Q-1)(A+1)t\} + R(A+1)t \qquad (4)$$

Figure 5:
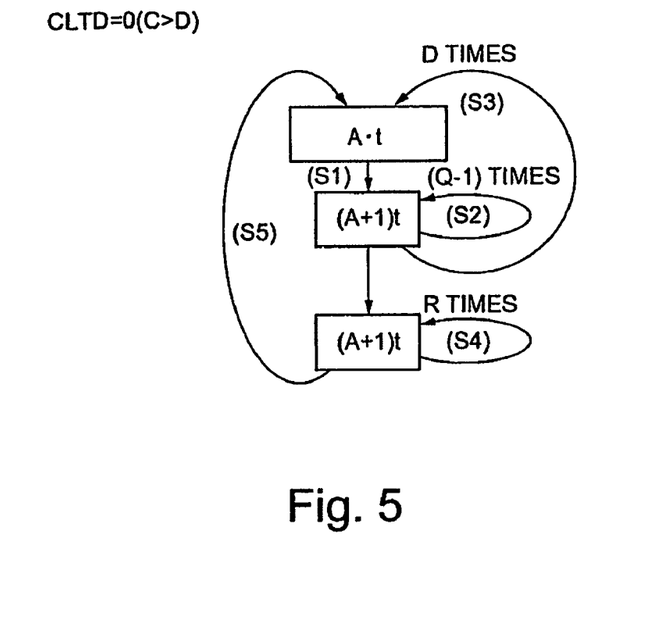
FIG. 5 is a sequence diagram showing a method of generating an output clock signal if C>D using the clock generation circuit shown in FIG. 1.
Figure 6:
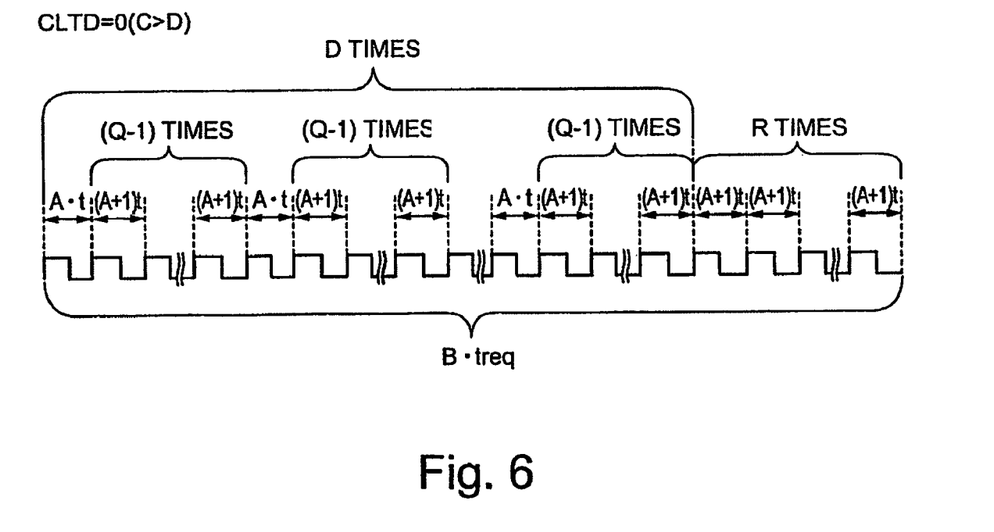
FIG. 6 is a waveform diagram showing the output clock signal generated in the method shown in FIG. 5.

The formula (4) is achieved by the sequence shown in FIG. 5, by which the output clock signal CLKreq shown in FIG. 6 is obtained. The sequence shown in FIG. 5 is obtained by replacing A·t and (A+1)t in the sequence shown in FIG. 3 with each other.

Referring to FIG. 5 and FIG. 6, a clock signal having A·t is output once, first (S1), and then subsequently a clock signal having (A+1)t is output (Q−1) times (S2). Next, steps S1 and S2 are repeated (S3) and thereafter (A+1)t is output R times (S4). Then, the process returns to step S1 (S5).

If C=D, Q=2 and R=0. Therefore, if either sequence in FIG. 3 or FIG. 5 is applied, a clock signal having (A+1)t and a clock signal having A·t each can be output once. While the case of C>D covers the case of C=D in the following description, the case of C<D may cover the case of C=D instead.

To achieve the above operation, the discrete value correction circuit 14 includes a Q counter 141, a Q register 142, a Q comparator 143, a C/D counter 144, a C/D register 145, a C/D comparator 146, an R counter 147, an R register 148, an R comparator 149, and a correction determination circuit 150.

The Q counter 141 counts a low-pulse width end signal LPW_CMP (the details are described later) output from the clock divider circuit 12 to accomplish the above step S2. The Q register 142 registers Q. The Q comparator 143 compares a value of the Q counter 141 with a value of the Q register 142 and outputs a Q end signal Q_CMP when the value of the Q counter 141 reaches the value of the Q register 142.

The C/D counter 144 counts the Q end signal Q_CMP to accomplish the above step S3. The C/D register 145 registers C or D. The C/D comparator 146 compares a value of the C/D counter 144 with a value of the C/D register 145 and outputs a C/D end signal C/D_CMP when the value of the C/D counter 144 reaches the value of the C/D register 145.

The R counter 147 counts the low-pulse end signal LPW_CMP to accomplish the above step S5. The R register 148 registers R. The R comparator 149 compares a value of the R counter 147 with a value of the R register 148 and outputs an R end signal R_CMP when the value of the R counter 147 reaches the value of the R register 148.

The correction determination circuit 150 changes the logical level of a divided clock selection signal Q_CYCLE from a high level to a low level in response to the Q end signal Q_CMP and changes the logical level of a divided clock selection signal Q_CYCLE from a low level to a high level in response to the first low-pulse width end signal LPW_CMP after receiving the Q end signal Q_CMP or the R end signal R_CMP. Moreover, the correction determination circuit 150 outputs an R enable signal R_EN in response to the R end signal R_CMP.

The counters 141, 144, and 147 operate in synchronization with the reference clock signal CLKref. The Q counter 141 and the C/D counter 144 are reset in response to the R enable signal R_EN. The R counter 147 is activated in response to the R enable signal R_EN.

The following describes the details of the clock divider circuit 12.

The clock divider circuit 12 generates the divided clock signal CKL1 by dividing the reference clock signal CLKref by A and generates the divided clock signal CLK2 by dividing the reference clock signal CLKref by (A+1).

It is further necessary here to determine a high-level pulse width and a low-level pulse width of the divided clock signals CLK1, CLK2. For the divided clock signal CLK1, both the high-level pulse width and the low-level pulse width can be set to nt if A is an even number (A=2n, where n is a natural number). If A is an odd number (A=2n+1), however, these pulse widths cannot be identical. Meanwhile, for the divided clock signal CLK2, both pulse widths can be identical if A is an odd number, while both pulse widths cannot be identical if A is an even number.

Table 1 lists the conditions required for maintaining a difference between both pulse widths within the range of t independently of whether A is an even number or an odd number.

TABLE 1

|   | CLK1 | | CLK2 | |
| --- | --- | --- | --- | --- |
| A | High pulse | Low pulse | High pulse | Low pulse |
| A = 2n | nt | nt | nt | (n + 1)t |
| A = 2n + 1 | (n + 1)t | nt | (n + 1)t | (n + 1)t |

Table 2 lists the conditions required for maintaining the duty cycle of the output clock signal CLKreq within the range of 45% to 55%.

TABLE 2

| C | A | Condition |
| --- | --- | --- |
| C = 0 | Even number | A ≧ 2 |
|  | Odd number | A ≧ 11 |
| C ≠ 0 | A ≦ 9 | Not supported |
|  | 10, 12, 14, 16, 18 | 1 > C/B > (20 − A)/11 |
|  | 11, 13, 15, 17 | (A − 10)/9 > C/B > 0 |
|  | A ≧ 19 | 1 > C/B > 0 |

To accomplish the above operation, the clock divider circuit 12 includes a high-pulse width (HPW) counter 121, a high-pulse width register 122, a high-pulse width comparator 123, a low-pulse width (LPW) counter 124, a low-pulse width register 125, a low-pulse width comparator 126, a switching register 127, and a state control circuit 128.

The high-pulse width counter 121 counts the reference clock signal CLKref to determine the high-level pulse width of the divided clock signal CLK1 or CLK2 to be generated. The high-pulse width register 122 registers (n−1) if A=2n and registers n if A=2n+1. The high-pulse width comparator 123 compares a value of the high-pulse width counter 121 with a value of the high-pulse width register 122 and outputs a high-pulse width end signal HPW_CMP when the value of the high-pulse width counter 121 reaches the value of the high-pulse width register 122.

The low-pulse width counter 124 counts the reference clock signal CLKref to determine the low-level pulse width of the divided clock signal CLK1 or CLK2 to be generated. The low-pulse width register 125 registers (n−1). The low-pulse width comparator 126 compares a value of the low-pulse width counter 124 with a value of the low-pulse width register 125 and outputs a low-pulse width end signal LPW_CMP when the value of the low-pulse width counter 124 reaches the value of the low-pulse width register 125.

The switching register 127 registers CLTD (C less than D)=1 (true) if C<D and registers CLTD=0 (false) if C>D.

The state control circuit 128 activates a high-pulse width enable signal HPW_EN in response to the low-pulse width end signal LPW_CMP and inactivates a low-pulse width enable signal LPW_EN. The state control circuit 128 inactivates the high-pulse width enable signal HPW_EN in response to the high-pulse width end signal HPW_CMP and activates the low-pulse width enable signal LPW_EN. The high-pulse width counter 121 is activated in response to the high-pulse width enable signal HPW_EN. The low-pulse width counter 124 is activated in response to the low-pulse width enable signal LPW_EN.

Furthermore, if CLTD=1 (C<D), the state control circuit 128 selects the divided clock signal CLK1 having the period A·t when the divided clock selection signal Q_CYCLE is at the high level or selects the divided clock signal CLK2 having the period (A+1)t when the divided clock selection signal Q_CYCLE is at the low level and outputs the selected divided clock signal as an output clock signal CLKreq. If CLTD=1, the state control circuit 128 selects the divided clock signal CLK1 having the period A·t independently of the divided clock selection signal Q_CYCLE when the R enable signal R_EN is at the high level and outputs the selected divided clock signal as an output clock signal CLKreq.

Still further, if CLTD=0 (C>D), the state control circuit 128 selects the divided clock signal CLK2 having the period (A+1)t when the divided clock selection signal Q_CYCLE is at the high level or selects the divided clock signal CLK1 having the period A·t when the divided clock selection signal Q_CYCLE is at the low level and outputs the selected divided clock signal as an output clock signal CLKreq. If CLTD=0, the state control circuit 128 selects the divided clock signal CLK2 having the period (A+1)t independently of the divided clock selection signal Q_CYCLE when the R enable signal R_EN is at the high level and outputs the selected divided clock signal as an output clock signal CLKreq.

The following describes the operation of the clock generation circuit 10 configured as described above. In this embodiment, it is described by giving an example of registering 2 on the high-pulse width register 122, 2 on the low-pulse register 125, 3 on the C/D register 145, 2 on the Q register 142, and 2 on the R register 148.

Figure 7:
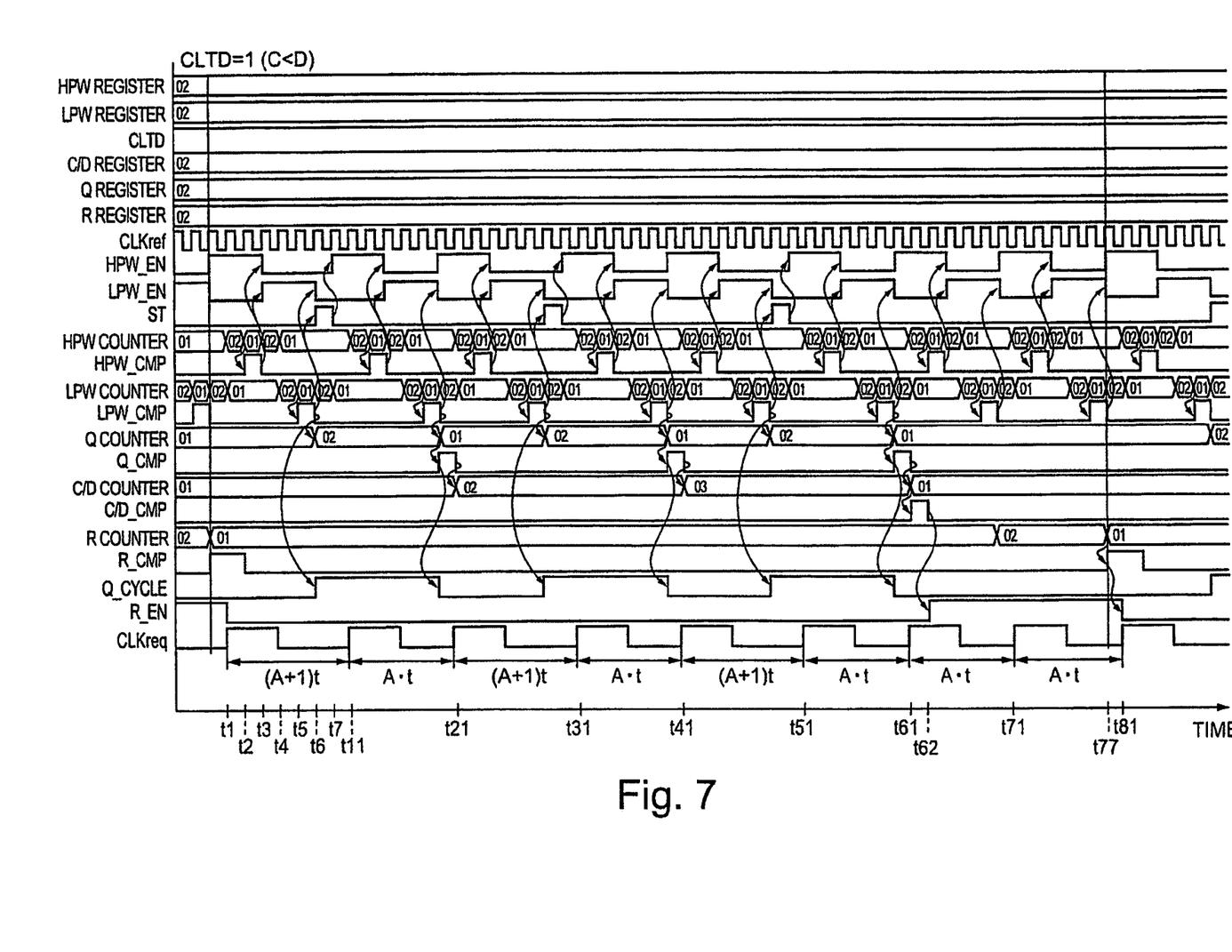
FIG. 7 is a timing diagram showing an operation in the case of C<D, which is performed by the clock generation circuit shown in FIG. 1.

If C<D, CLTD=1 (high level) is registered on the switching register 127 with reference to FIG. 7.

After the high-pulse width enable signal HPW_EN rises up, the reference clock signal CLKref rises up at time t1 and thereupon the output clock signal CLKreq is set to the high level. When the high-pulse width counter 121 reaches value 2 at time t2, the high-pulse width end signal HPW_CMP rises up. Thereafter, when the high-pulse width end signal HPW_CMP falls down at time t3, the high-pulse width enable signal HPW_EN falls down and instead the low-pulse width enable signal LPW_EN rises up. This inactivates the high-pulse width counter 121 and activates the low-pulse width counter 124.

After the high-pulse width enable signal HPW_EN falls down, the reference clock signal CLKref rises up at time t4 and thereupon the output clock signal CLKreq is set to the low level. Thereby, the high pulse of the divided clock signal CLK2 having the period (A+1)t is output as an output clock signal req.

Subsequently, when the low-pulse width counter 124 reaches value 2 at time t5, the low-pulse width end signal LPW_CMP rises up. Thereafter, when the low-pulse width end signal LPW_CMP falls down at time t6, the low-pulse width enable signal LPW_EN falls down and the state transition signal ST rises up. This inactivates the low-pulse width counter 124. Moreover, the low-pulse width end signal LPW_CMP falls down and the Q counter 141 reaches value 2, and thereupon the divided clock selection signal Q_CYCLE is set to the high level.

After the state transition signal ST falls down at time t7, the reference clock signal CLKref rises up at time t11 and thereupon the output clock signal CLKreq is set to the high level. Thereby, the low pulse of the divided clock signal CLK2 having the period (A+1)t is output as an output clock signal req.

Since the divided clock selection signal Q_CYCLE is at the high level, the divided clock signal CLK1 having the period A·t is output as an output clock signal req during the subsequent time period t11 to t21. As a result, during the time period t1 to t61, the combination of a divided clock signal CLK2 having one period and a divided clock signal CLK1 having one period is output as an output clock signal req three times.

When the C/D counter 144 reaches value 3, the C/D end signal C/D_CMP rises up at time t61. When the C/D end signal C/D_CMP falls down at time t62, the R enable signal R_EN rises up, thereby activating the R counter 147. When the R counter 147 reaches value 2, the R end signal R_CMP rises up at time t77 and thereafter the R enable signal R_EN falls down at time t81. As a result, during the time period t61 to t81, a divided clock signal CLK1 having two periods is output as an output clock signal req.

Figure 8:
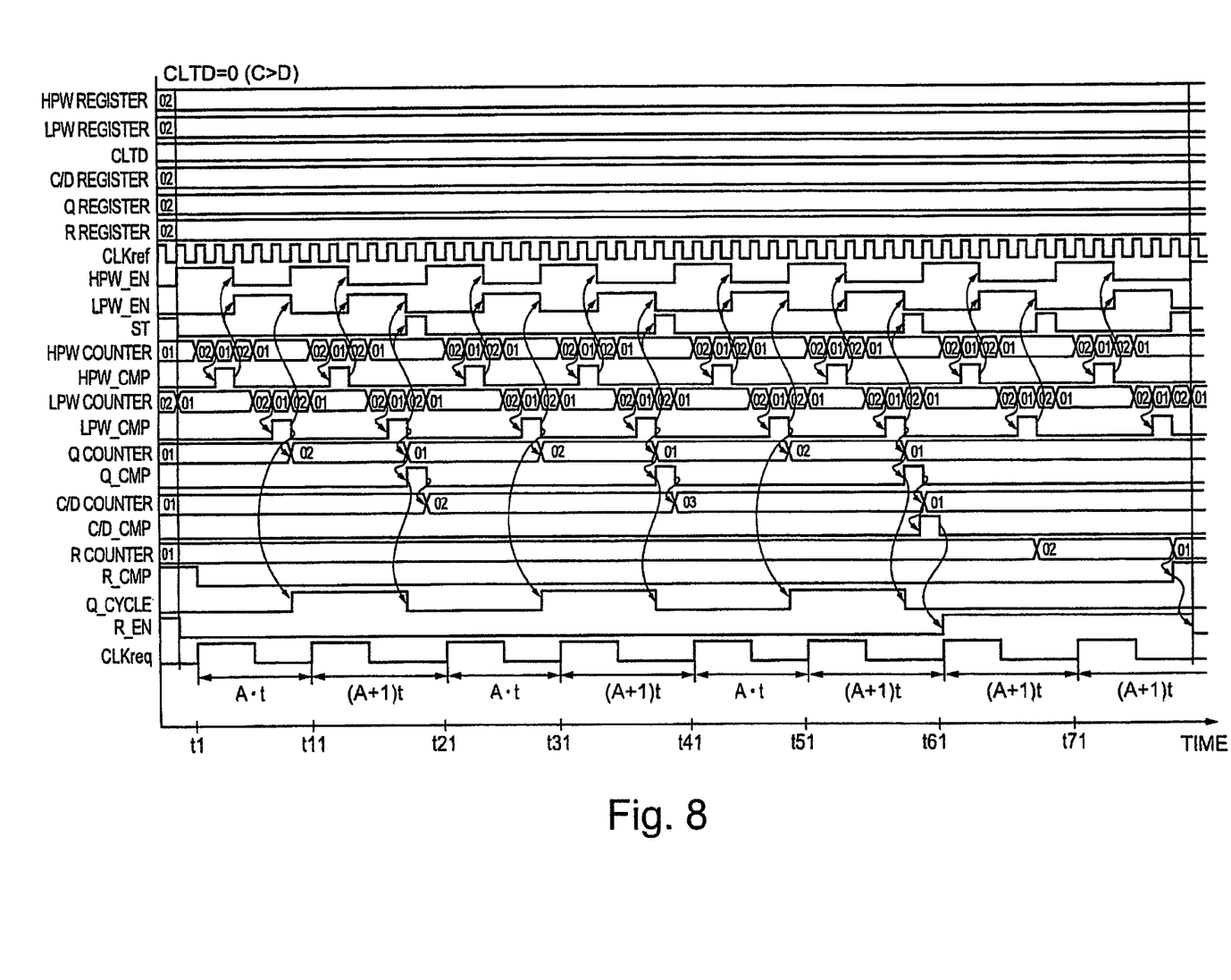
FIG. 8 is a timing diagram showing an operation in the case of C>D, which is performed by the clock generation circuit shown in FIG. 1.

Meanwhile, if C>D, the switching register 127 is set to CLTD=0 (low level) with reference to FIG. 8. In this condition, the divided clock signals CLK1 and CLK2 are output conversely.

According to this embodiment of the present invention, the discrete value correction circuit 14 controls the clock divider circuit 12 so as to repeat C times the process of generating the divided clock signal CLK2 once and generating the divided clock signal CLK1 (Q−1) times if C<D and controls the clock divider circuit 12 so as to repeat D times the process of generating the divided clock signal CLK1 once and generating the divided clock signal CLK2 (Q−1) times if C>D. Therefore, it is possible to generate the output clock signal CLKreq having the frequency freq between the frequency fref/A of the divided clock signal CLK1 and the frequency fref/(A+1) of the clock signal CLK2.

Moreover, the discrete value correction circuit 14 controls the clock divider circuit 12 so as to generate the divided clock signal CLK1 R times if C<D and controls the clock divider circuit 12 so as to generate the divided clock signal CLK2 R times if C>D. Therefore, it is possible to equally distribute the remainder of fref/freq.

Furthermore, the clock divider circuit 12 maintains the divided clock signals CLK1, CLK2 at the high level until it receives the reference clock signal CLKref n times if A=2n and maintains the divided clock signals at the high level until it receives the reference clock signal (n+1) times if A=2n+1. In addition, the clock divider circuit 12 maintains the divided clock signal CLK1 at the low level until it receives the reference clock signal CLKref n times and maintains the divided clock signal CLK2 at the low level until it receives the reference clock signal CLKref (n+1) times. Therefore, it is possible to maintain the duty cycle of the output clock signal CLKreq within an allowable range. Furthermore, if A, B, and C are set in such a way as to satisfy the conditions shown in Table 2, it is possible to maintain the duty cycle of the output clock signal CLKreq within 45% to 55% so as to comply with ISO7816-3.

While the present invention has been described in connection with certain preferred embodiments, it is to be understood that the above preferred embodiments are only illustrative of the present invention. Therefore, the subject matter encompassed by the present invention is not limited to those specific embodiments. On the contrary, the above embodiments can be appropriately altered, modified, or the like within the spirit and scope of the invention.

What is claimed is:

1. A clock generation circuit for generating an output clock signal having a frequency freq between a frequency fref/A of a first divided clock signal and a frequency fref/(A+1) of a second divided clock signal on the basis of the first divided clock signal obtained by dividing a reference clock signal having a frequency fref by A and the second divided clock signal obtained by dividing the reference clock signal by (A+1), said clock generation circuit comprising:

dividing means for selectively generating the first divided clock signal and the second divided clock signal and for outputting a selected divided clock signal as the output clock signal; and correction means for controlling said dividing means so as:

if C<D, repeating C times the process of generating the second divided clock signal once and generating the first divided clock signal (Q−1) times; and if C>D, repeating D times the process of generating the first divided clock signal once and generating the second divided clock signal (Q−1) times, where A, B, and C are natural numbers satisfying the following formula (1):

freq=fref/(A+C/B) (1); and where D=B−C, Q is the quotient of B/C for C<D, and Q is the quotient of B/D for C>D.

2. The circuit according to claim 1, wherein said correction means further controls said dividing means so as to generate the first divided clock signal R times if C<D and controls said dividing means so as to generate the second divided clock signal R times if C>D, where R is the remainder of B/C for C<D or the remainder B/D for C>D.

3. The circuit according to claim 1, wherein said dividing means includes:

high-pulse generation means for maintaining the first or second divided clock signal at a high level until it receives the reference clock signal n times if A=2n (n: natural number) and maintaining the first or second divided clock signal at the high level until it receives the reference clock signal (n+1) times if A=2n+1; and low-pulse generation means for maintaining the first divided clock signal at a low level until it receives the reference clock signal n times and maintaining the second divided clock signal at a low level until it receives the reference clock signal (n+1) times.

4. The circuit according to claim 1, wherein said dividing means includes:

a high-pulse width counter for counting the reference clock signal;

a high-pulse width register for registering n if A=2n (n: natural number) and registering (n+1) if A=2n+1 a high-pulse width comparator for comparing a value of said high-pulse width counter with a value of said high-pulse width register and outputting a high-pulse width end signal if the value of said high-pulse width counter reaches the value of said high-pulse width register;

a low-pulse width counter for counting the reference clock signal;

a low-pulse width register for registering n;

a low-pulse width comparator for comparing a value of said low-pulse width counter with a value of said low-pulse width register and outputting a low-pulse width end signal if the value of said low-pulse width counter reaches the value of said low-pulse width register; and a state control circuit for activating said high-pulse width counter in response to the low-pulse width end signal, activating said low-pulse width counter in response to said high-pulse width end signal, and selecting the first or second divided clock signal in response to a divided clock selection signal, and wherein said correction means includes:

a Q counter for counting the low-pulse width end signal;

a Q register for registering Q;

a Q comparator for comparing a value of the Q counter with a value of said Q register and outputting a Q end signal if the value of the Q counter reaches the value of the Q register;

a C/D counter for counting the Q end signal;

a C/D register for registering C or D;

a C/D comparator for comparing a value of said C/D counter with a value of said C/D register and outputting a C/D end signal if the value of the C/D counter reaches the value of said C/D register; and a correction determination circuit for changing a logical level of the divided clock selection signal in response to the Q end signal and changing a logical level of the divided clock selection signal in response to the first low-pulse width end signal after receiving the Q end signal.

5. The circuit according to claim 4, wherein said correction means further includes:

an R counter for counting the low-pulse width end signal;

an R register for registering R; and an R comparator for comparing a value of said R counter with a value of said R register and outputting an R end signal if the value of said R counter reaches the value of the R register, and wherein said correction determination circuit activates the R register in response to the C/D end signal, where R is the remainder of B/C for C<D or the remainder of B/D for C>D.

6. A clock generation method for generating an output clock signal having a frequency freq between a frequency fref/A of a first divided clock signal and a frequency fref/(A+1) of a second divided clock signal on the basis of the first divided clock signal obtained by dividing a reference clock signal having a frequency fref by A and the second divided clock signal obtained by dividing the reference clock signal by (A+1), said clock generation method comprising the steps of:

if C<D;

(a) generating the second divided clock signal once;

(b) generating the first divided clock signal (Q−1) times after generating the second divided clock signal;

(c) repeating the steps of (a) and (b) C times;

If C>D;

(d) generating the first divided clock signal once;

(e) generating the second divided clock signal (Q−1) times after generating the first divided clock signal; and (f) repeating the said steps of (d) and (e) D times, where A, B, and C are natural numbers satisfying the following formula (1):

freq=fref/(A+C/B) (1); and where D=B−C, Q is the quotient of B/C for C<D, and Q is the quotient of B/D for C>D.

7. The method according to claim 6, further comprising the steps of:

generating the first divided clock signal R times after said step of repeating C times if C<D; and generating the second divided clock signal R times after said step of repeating D times if C>D, where R is the remainder of B/C for C<D, or the reminder of B/D for C>D.

8. The method according to claim 6, wherein said step of generating the first divided clock signal includes the steps of:

if A=2n (n: natural number), maintaining the first divided clock signal at a high level until the reference clock signal is received n times; and maintaining the first divided clock signal at a low level until the reference clock signal is received n times after said step of maintaining the first divided clock signal at the high level; and if A=2n+1, maintaining the first divided clock signal at the high level until the reference clock signal is received (n+1) times; and maintaining the first divided clock signal at the low level until the reference clock signal is received n times after said step of maintaining the first divided clock signal at the high level, and wherein said step of generating the second divided clock signal includes the steps of:

if A=2n, maintaining the second divided clock signal at a high level until the reference clock signal is received n times; and maintaining the second divided clock signal at a low level until the reference clock signal is received (n+1) times after said step of maintaining the second divided clock signal at the high level; and if A=2n+1, maintaining the second divided clock signal at the high level until the reference clock signal is received (n+1) times; and maintaining the second divided clock signal at the low level until the reference clock signal is received (n+1) times after said step of maintaining the second divided clock signal at the high level.

* * * * *